Aug. 15, 1950  A. C. THOMPSON ET AL  2,519,005
WINDROW TURNER
Filed March 18, 1946  2 Sheets-Sheet 1
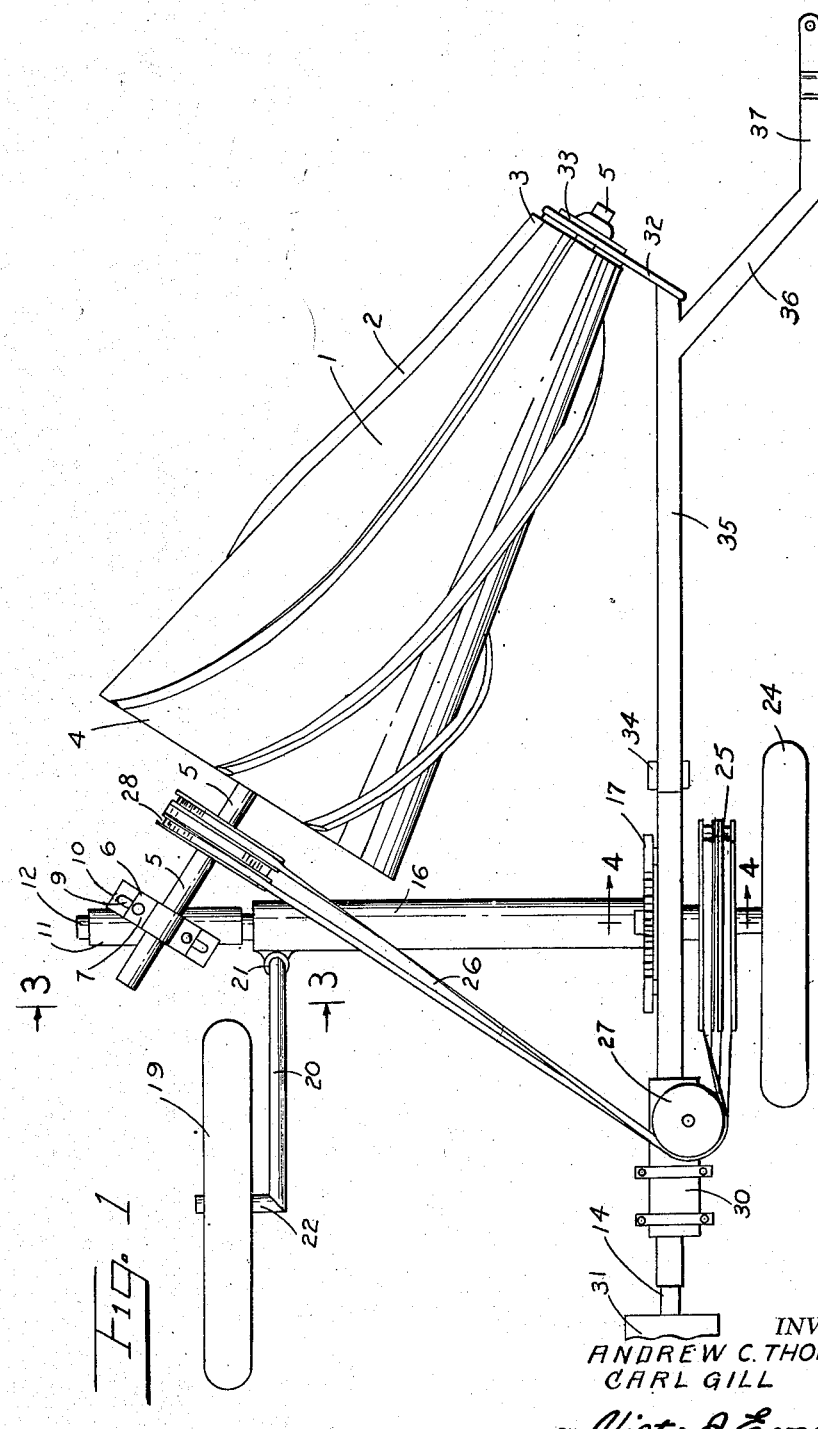
INVENTOR.
ANDREW C. THOMPSON
CARL GILL
BY *Victor J. Evans & Co.*
ATTORNEYS Aug. 15, 1950     A. C. THOMPSON ET AL     2,519,005
WINDROW TURNER
Filed March 18, 1946     2 Sheets-Sheet 2
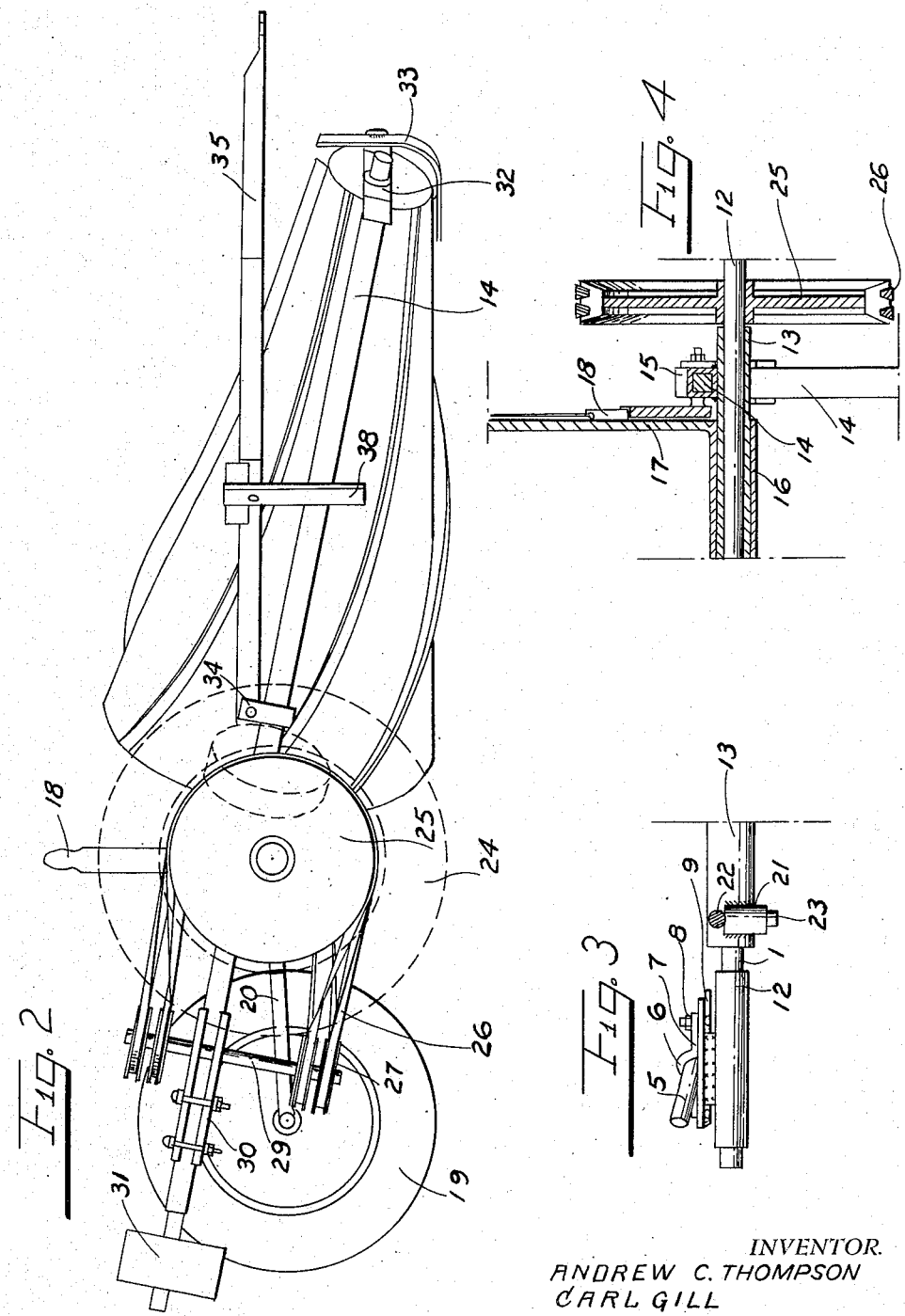
INVENTOR.
ANDREW C. THOMPSON
CARL GILL
BY *Victor J. Evans & Co.*
ATTORNEYS Patented Aug. 15, 1950

2,519,005

UNITED STATES PATENT OFFICE 2,519,005

WINDROW TURNER

Andrew C. Thompson and Carl Gill,
Madera, Calif.

Application March 18, 1946, Serial No. 655,259

1 Claim. (Cl. 56—372)

Our present invention, in its broad aspect, has to do with improvements in machines for turning alfalfa, and other hay, in windrows a few hours before baling or picking with a hay loader, and more particularly, it is my purpose to provide a cone with spiral ribs or vanes which will turn the windrows without beating or loss of leaves, thereby saving loss of protein and weight and color and enabling the farmer to get the hay off of the ground several days sooner than he would be able to do with other types of equipment. It has been found that side delivery rakes beat the hay too much, and are also expensive pieces of equipment, whereas our device is light, and is not complicated, expensive, or characterized by a plurality of small, fragile or intricate parts which are likely to become broken or deranged or otherwise inapt for use. One of the principal advantages of our cone is that as it moves forward with the cone turning the spiral ribs or vanes will get under the alfalfa or other hay at the small end and the hay will ride the ribs back to the high end, raising and turning it as it goes. We provide a simplified traction drive and frame, and my device is otherwise desirable and practical.

Other and equally important objects and advantages of our invention will be apparent from the following description and drawings, and it is pointed out that changes in form, size, shape, materials and construction and arrangement of parts is permissible and within the purview of our broad inventive concept and the scope of the appended claim.

In the drawings, wherein we have illustrated a preferred form of our invention:

Figure 1 is a top plan view;

Figure 2 is a side view showing the cone in perspective;

Figure 3 is a section on an enlarged scale taken on the line 3—3 of Figure 1 and Figure 4 is a section on an enlarged scale taken on the line 4—4 of Figure 1.

In the drawings, wherein like characters of reference are used to designate like or similar parts:

The numeral 1 designates our cone which has a series of spiral ribs or vanes 2 from the small front end 3 to the large rear end 4. The cone has a diagonally disposed center shaft 5 which is journalled at its rear end in a slide bearing 6 having a top plate 7 bolted as at 8 through the slots 9 in a bottom plate 10 on the sleeve 11 carried on the end of the shaft or axle 12. The axle 12 is journalled in a tube 13 mounted on the longitudinal frame element or beam 14 by a bracket 15. The tube carries a sleeve 16 mounting a segmental rack 17 with a lever and dog 18 for adjusting a swivelled supporting wheel 19 carried on the rod 20 mounted in the bearing 21 on the sleeve 16. The rod 20 has a lateral right angled part 22 carrying the wheel, and a turned down right angular end 23 received in the bearing 21. The shaft 12 carries a traction and power wheel 24 and a double V-belt pulley 25 over which is trained a double V-belt 26 and thence about an idler 27 and about a double V-belt driven pulley 28 on the cone shaft 5 to rotate the cone. The idlers are carried on a short shaft 29 on a clamp bracket 30 on the frame element 14. At the end of the frame element is a counterweight 31. The frame element 14 is angled downwardly in a forward direction and carries a lateral bearing plate 32 mounting the forward end of the cone shaft 5 and has a ground contacting strap formed substantially right angular providing a shoe 33. Coupled as at 34 to the frame element 14 is a substantially horizontal pull bar or tongue 35 which is positioned directly above the beam or element 14 and is provided with a diagonally extended section 36 and a forward end 37 at its forward end and carries an intermediate support 38.

From the foregoing, it is believed that the operation and advantages of our invention will be apparent, but it is again pointed out that interpretation of the scope of our invention should only be conclusive when made in the light of the subjoined claim.

We claim:

In a windrow turner, the combination which comprises a transversely disposed axle having a power wheel on one end, a tube in which the axle is journaled, a longitudinally disposed beam carried by the tube of the axle in an inclined position with the forward end extended downwardly, a substantially horizontally disposed tongue attached to the beam at a point midway of the length thereof and extended forwardly therefrom, a supporting wheel pivotally mounted on the tube of the axle through a rod and positioned to follow the end of the axle opposite to that on which the power wheel is positioned, a diagonally positioned shaft journaled on the forward end of the beam at one end and on an extended end of the axle at the other, a frustro-conical shaped turning element having spiral vanes on the outer surface carried by the diagonally disposed shaft with the small end of the turning element extended forwardly, and a belt trained over pulleys on the axle, shaft, and beam for rotating the turning element by the axle whereby in the forward movement of the turner the power wheel rotates the turning element in a counterclockwise direction to turn hay in a windrow over which the turner is traveling.

ANDREW C. THOMPSON.
     CARL GILL.

REFERENCES CITED

The following references are of record in the file of this patent:

UNITED STATES PATENTS

| Number | Name | Date |
|---|---|---|
| 1,272,617 | Burgess | July 16, 1918 |
| 1,294,822 | Mowry | Feb. 18, 1919 |

FOREIGN PATENTS

| Number | Country | Date |
|---|---|---|
| 89,495 | Switzerland | May 16, 1921 |
| 212,599 | Switzerland | Mar. 17, 1941 |